United States Patent [19]

Fooladi

[11] 3,929,865

[45] Dec. 30, 1975

[54] N-1-NAPHTHYLCARBAMIC ACID-2,4,5-TRICHLOROPHENOL ESTER

[76] Inventor: Mike Mehdi Fooladi, Apt. 4-B, Oakmont Manor Apts., Vicksburg, Miss. 39180

[22] Filed: Nov. 13, 1974

[21] Appl. No.: 523,496

[52] U.S. Cl. .............................. 260/471 C; 71/111
[51] Int. Cl.² ...................................... C07C 125/06
[58] Field of Search ................................ 260/471 C

[56] References Cited
UNITED STATES PATENTS 2,903,478  9/1959  Lambrech ...................... 260/471 C
2,945,877  7/1960  Zima et al. ...................... 260/471 C

*Primary Examiner*—James A. Patten

[57] ABSTRACT

N-1-Naphthylcarbamic Acid-2,4,5-Trichlorophenol ester is synthesized by reaction of 2,4,5-Trichlorophenol with 1-Naphthylisocyanate. Product is useful for fungicide and herbicide, especially as a post emergence herbicide in agricultural formulation.

1 Claim, No Drawings

N-1-NAPHTHYLCARBAMIC ACID-2,4,5-TRICHLOROPHENOL ESTER

DESCRIPTION OF THE INVENTION

A new chemical compound, namely, N-1-Naphthyl- carbamic acid- 2,4,5-Trichlorophenol ester is found. The product is a compound having the following structural formula:

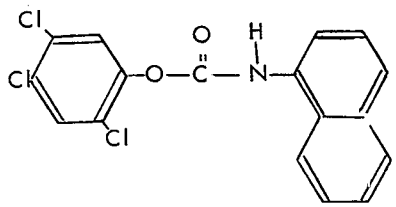

The described compound may be prepared by reacting one part of 2,4,6-Trichlorophenol with one part of 1-Naphthylisocyanate in an inert solvent such as benzene, toluene, chloroform, or carbontetrachloride. The invented compound may also be prepared by reacting one part of 2,4,6-Trichlorophenol with two parts of phosgene followed by reaction of resulting intermediate with one part of 1-Naphthylamine in an inert solvent.

The following example is illustrative of the preparation of the invention compound:

EXAMPLE I

Preparation of N-1-Naphthylcarbamic Acid-2,4,5-Trichlorophenol ester: A mixture of 2,4,5-Trichlorophenol (20.0 g; 0.1 mole), 1-Naphthylisocyanate (17.0 g; 0.1 mole) and 100 ml toluene was stirred and refluxed for twenty-four hours. The mixture was cooled then poured into 300 ml of cold water while stirring. the resulting solid material was filtered and dried to give 24 grams of N-1-Naphthylcarbamic acid-2,4,5-Trichlorophenol ester. M.P. 176°C–178°C.

Analysis for $C_{17}H_{10}NO_2Cl_3$

| Analysis for $C_{17}H_{10}NO_2Cl_3$ | | | | | |
|---|---|---|---|---|---|
| Theory: | C, | 55.66% | Found: | C, | 55.56% |
| | H, | 2.73% | | H, | 2.33% |
| | N, | 3.82% | | N, | 3.55% |
| | Cl, | 29.06% | | Cl, | 29.11% |

Solutions at various concentrations of described compound were prepared by dissolving the compound in a mixture of acetone and emulsifiers. Each solution was dispersed in distilled water. The results are tabulated in Table I.

TABLE I

| Invention Compound | Rate Lbs./A | Mustard | | Pigweed | | Herbicidal Screening Crabgrass | | Foxtail | | Corn | | Wheat | | Cotton | | Beans | |
|---|---|---|---|---|---|---|---|---|---|---|---|---|---|---|---|---|---|
| | | Pre | Post | Pre | Post | Pre | Post | Pre | Post | Pre | Post | Pre | Post | Pre | Post | Pre | Post |
| '' | 20 | 0 | 5G | 0 | 5G | 0 | 2G | 0 | 2G | 0 | 1G | 0 | 1G | 0 | 3G | 0 | 3G |
| '' | 10 | 0 | 4G | 0 | 5G | 0 | 1T | 0 | 1T | 0 | 1G | 0 | 0 | 0 | 0 | 0 | 0 |
| '' | 5 | 0 | 4G | 0 | 5G | 0 | 0 | 0 | 0 | 0 | 0 | 0 | 0 | 0 | 0 | 0 | 0 |
| '' | 2 | 0 | 1G | 0 | 2G | 0 | 0 | 0 | 0 | 0 | 0 | 0 | 0 | 0 | 0 | 0 | 0 |

The letter ratings in Table I are:
0 = None
1G = Slight general necrosis
2G = Moderate general necrosis
3G = Moderately severe general necrosis
4G = Severe general necrosis
5G = Death general necrosis
1T = Slight tip burn

FUNGICIDAL ACTIVITY OF N-1-NAPHTHYLCARBAMIC ACID-2,4,5-TRICHLOROPHENOL ESTER

Soil Drench: Rhizoctonia sp. disease was mixed with a soil prepared from three parts loam and two parts sand.

The treatments were applied as a drench to a small flat with forty pea seeds.

A negative control with untreated soil and seeds and one with fungus treated soil and untreated seeds served as base line standards. All flats were watered uniformly and maintained in a controlled temperature and humidity environment. The percentages of germinating and growing plants were recorded and tabulated after three weeks in Table II.

TABLE II

| | Fungicidal Screening — Soil Drench | |
|---|---|---|
| Compound | Rate Lbs./A | % Growing Pea Seeds Rhizoctonia |
| Invented Compound | 20 | 95 |
| Compound | 10 | 85 |
| Terraclor | 20 | 95 |
| Terraclor | 10 | 90 |
| Untreeated-inoculated | | 60 |
| Untreated-sterile soil | | 95 |

I claim:
1. Compound having the formula

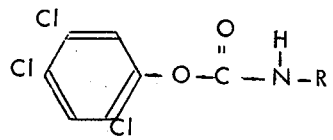

wherein R r is 1-naphthyl group.

* * * * *